J. F. MAIER.
RIDING ATTACHMENT FOR CORN PLANTERS.
APPLICATION FILED MAR. 12, 1908.
901,181.
Patented Oct. 13, 1908.
3 SHEETS—SHEET 1.
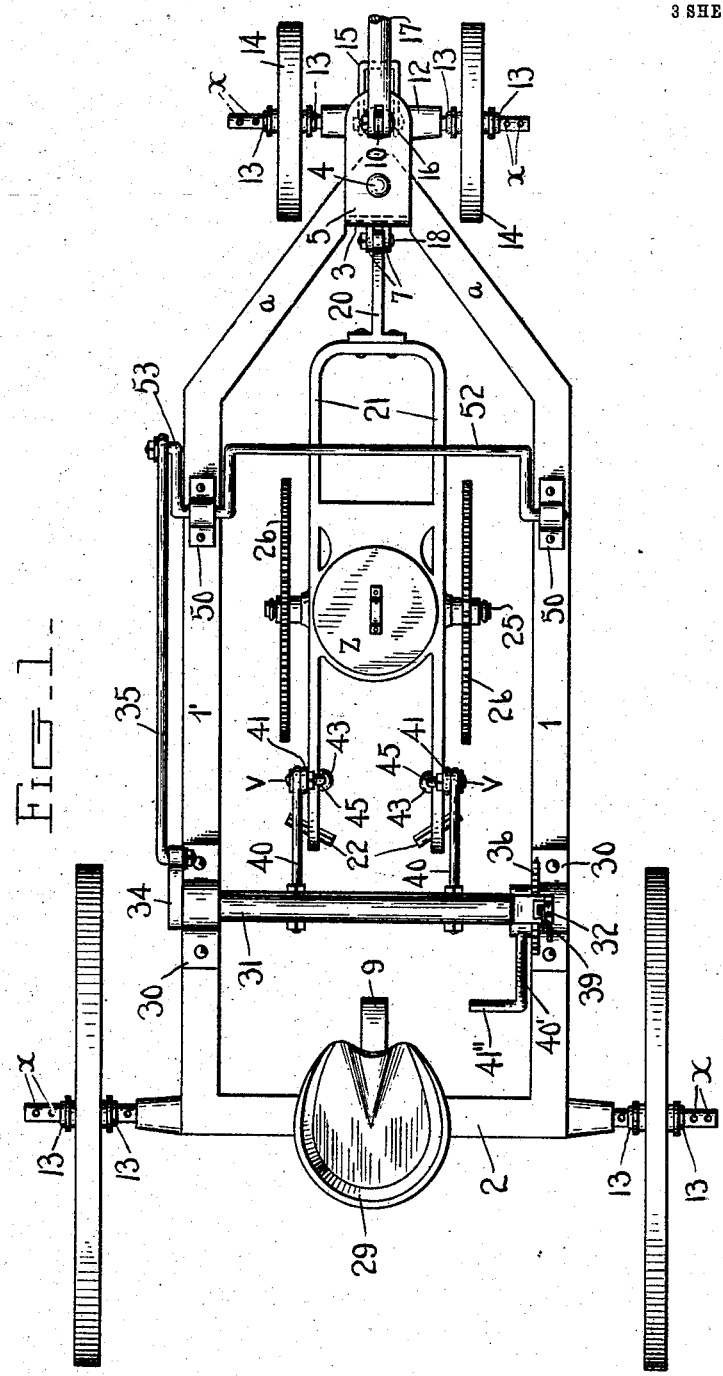
Witnesses
L. B. James
Geo. W. Sils
Inventor
Joseph F. Maier
By Chandler Chandler
Attorneys

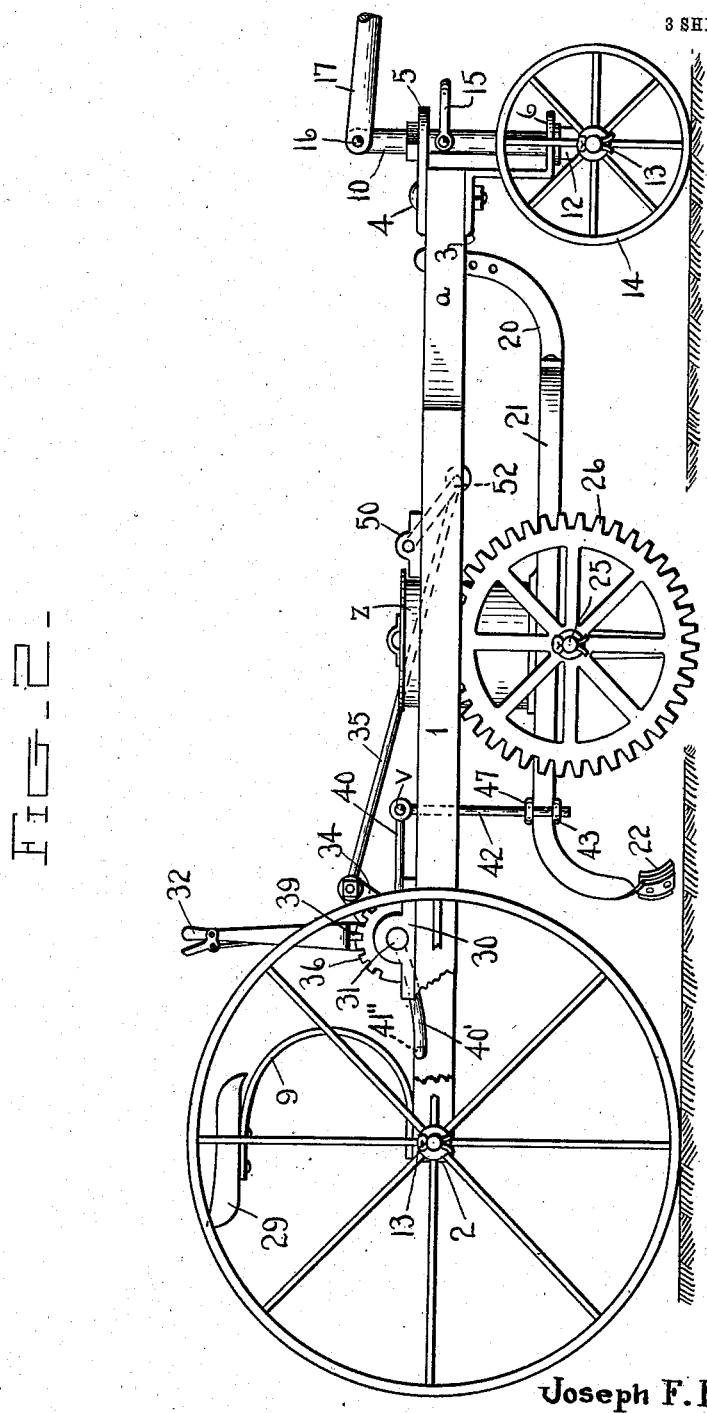

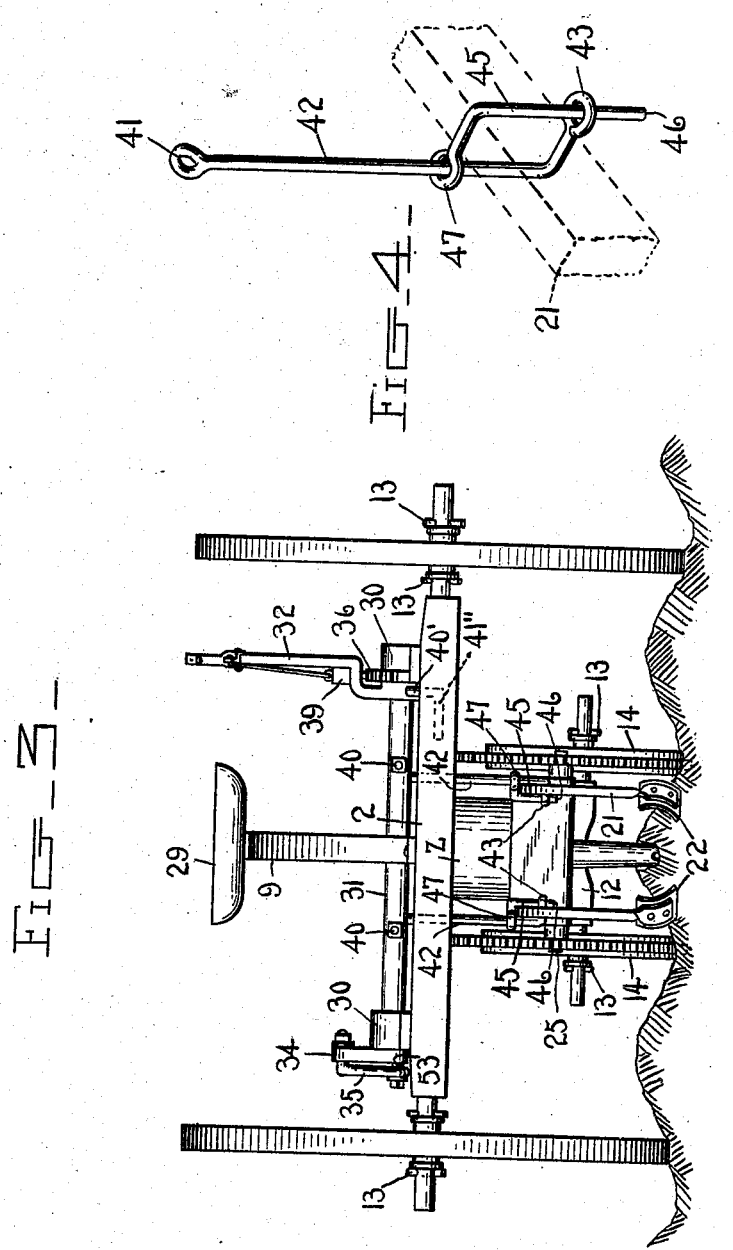

UNITED STATES PATENT OFFICE.

JOSEPH F. MAIER, OF BROUGHTON, KANSAS.

RIDING ATTACHMENT FOR CORN-PLANTERS.

No. 901,181.     Specification of Letters Patent.     Patented Oct. 13, 1908.

Application filed March 12, 1908. Serial No. 420,718.

*To all whom it may concern:*

Be it known that I, JOSEPH F. MAIER, a citizen of the United States, residing at Broughton, in the county of Clay, State of Kansas, have invented certain new and useful Improvements in Riding Attachments for Corn-Planters; and I do hereby declare the following to be a full, clear, and exact description of the invention, such as will enable others skilled in the art to which it appertains to make and use the same.

This invention relates to certain new and useful improvements in riding attachments for corn planters.

The object of this invention is, to provide a simple riding attachment for seed drills, arranged so that a walking drill or planter, of any usual construction, may be readily attached to my wheel provided frame, to provide a means whereby the operator may ride instead of following the drill afoot; and my invention embodies certain other combinations and arrangements of parts, as will be more fully described hereinafter.

In the accompanying drawings, I have shown in Figure 1, a top view of my invention. Fig. 2 shows a side view with parts broken away, of my improvement. Fig. 3 is a rear end elevation, and Fig. 4 an enlarged detached detail of the shackle as used in my invention.

The aim of my invention is, to provide a readily operated wheel supported frame, in which the factors of simplicity of design and durability of construction have been kept in view and which is so contrived as to adjustably receive a drill, thereby providing a device especially adapted to be used in replanting listed corn or like grain, in poor stand.

Where it is found necessary to replant corn, owing to the depredation of cut worms or for other causes, the operation of replanting, if accomplished by means of a machine, represents a difficult task as the machine used in replanting must be so constructed, as to be readily and instantly operated, to throw out of working condition the seed shoe, to prevent the same from tearing out the standing corn. In my present invention I have contrived a machine, whereby the operation of replanting may be properly accomplished.

In the accompanying drawings, 1 represents a side bar and 1′ a similar bar, these two bars being provided with the obliquely bent ends $a$, united at their forward ends and secured to a yoke 3, which is provided above and below with suitable perforations adapted to receive the king pin 4. This yoke 3 is provided with the upper ear 5, and the lower ear 6, as shown in Fig. 3. Extending rearwardly is the perforated ear 7.

Revolubly held within the ears 5 and 6 is the vertically disposed shaft 10 which below carries the stub axle 12 adjustably holding the caster wheels 14. As shown in Fig. 1, the axle 12 has its ends reduced and provided with suitable perforations $x$ adapted to receive the stop pins 13, 13 which adjustably hold the caster wheels upon the stub axle. By this means the caster wheels may be given any desired lateral adjustment. Midlength the vertical shaft 10, is provided with the clevis 15, to which the draft animals are secured. At its upper end the shaft 10 is provided with the pin 16, receiving the bifurcated end of the tongue 17, as indicated in Figs. 1 and 2.

Adjustably held to the ear 7, by means of the pin 18 is the perforated curved bar 20, securely fastened to the shovel beams 21, which at their ends are provided with the usual shovels 22 and is of that type having two operating wheels 26, 26. The shovel beams support a seed hopper $z$ as is usual in the art, the dropper mechanism not shown being actuated by means of the shaft 25, provided with the usual operating disks or wheels 26, as clearly disclosed in Figs. 1 and 2. The seed drill is provided with the usual seed duct and furrow opener, not shown in the drawings as used in connection with this class of planters.

The ends of the rear axle 2 are also provided with a set of pin openings $x$ adapted to removably receive the adjusting pin 13, so that the width may be regulated. Extending upwardly from the rear axle 2 is the seat bracket 9 to the upper end of which is secured the seat 29.

Secured to the frame bars 1 and 1′ near their rear ends are the bearings 30, 30 within which bearings is revolubly held the transverse crank shaft 31. This crank shaft as is disclosed in Fig. 1 is provided with the crank 34, from which is extended the connecting rod 35. At its opposite end this crank shaft 31 is provided with the operating lever 32 working in conjunction with the gear sector 36, the lever being provided with the usual pawl mechanism 39.

Extending from the crank shaft 31 are the supporting arms 40, 40 carrying at their ends the bolts v, these bolts in turn receiving the terminal eyes 41 of the L-shaped supporting links 42 which links at their lower ends are bent at right angles and terminate in the eyes 43 as clearly disclosed in Fig. 4. In conjunction with these L-shaped supporting bars or links, I use an L-shaped stub locking link 45 having the end 46 bent at right angles to the stem portion 45 and ending in the terminal eye 47. In Fig. 4, I have shown in dotted lines a portion of one of the shovel beams 21 disclosing the manner of detachably securing the shovel beams to my frame. As these shovel beams will be of different shape a shackle is required that will be arranged to engage any shovel beam. In my invention by means of the locking link 45 a seed drill of any construction may be properly secured to the frame. Extended rearwardly from the crank shaft 31 is the trip lever 40' having the inwardly bent ear 41, upon which the foot of the operator rests.

The instrumentalities are so arranged that when the drill is in operation the trip lever will project rearward approximately in a horizontal plane as shown in Fig. 2.

It is of course understood that I provide an implement by means of which listing and drill planting are simultaneously performed. In the operation of replanting however extreme care must be exercised so that the new seed will be dropped at proper points between the standing plant while avoiding injury to or uprooting the growing plant. By means of the trip lever 40', the operator may rock the crank shaft 31 to instantly carry out of the ground the shovels 22.

Now in order to prevent the seed from being scattered while the drill is not in operation, I provide the frame bars 1 and 1' near their forward edges with the bearings 50, pivotally supporting the duplex crank shaft, provided with the intermediate crank 52 and the terminal crank 53, this terminal crank being engaged by the connecting rod 35 as clearly indicated in Fig. 1. The disks 26 are provided with serrated edges as clearly indicated, and the duplex crank shaft is so arranged that when the drill is thrown out of the ground, it swings back to engage between the teeth of the disk 26, to hold said disks in a locked condition, and thereby preventing any scattering of the grain when the machine is not in working operation. In the use of this machine the rear wheels run a little to one side of the center of a furrow, while the front wheels run squarely in the furrow to prevent any swerving of the machine.

In carrying the machine through the field, the same is guided by means of the tongue 17 and drawn by means of the clevis 15, to which the doubletree is secured. From this it will be seen that I provide a wheel-supported frame to which any ordinary corn planter may be secured.

And having thus described my said invention what I claim as new and desire to secure by U. S. Letters Patent is—

1. The combination with a supporting frame, of a wheel axle secured to the rear end of said frame, a vertical shaft carried at the forward end of said frame, a stub axle secured to said shaft supporting two wheels, a tongue secured to said shaft, a lever provided crank shaft, means to lock said lever, supporting arms extending from said crank shaft, a frame secured at its forward end to the forward end of said supporting frame, and connecting links extending from the shovel beams of said frame to said supporting arms.

2. The combination with a supporting frame, comprising two side bars bent inward and united at their forward ends, of a wheel supporting axle secured to the rear end of said side bars, a vertical shaft carried at the forward end of said frame, a stub axle secured to said shaft supporting two caster wheels, a tongue secured to said shaft, a horizontal crank shaft, a lever secured to said crank shaft, means to lock said lever, supporting arms fixed to said crank shaft, and a seed frame secured at its forward end to the forward end of said supporting frame, and connecting links extending from the shovel beams of said frame to said supporting arms.

3. The combination in a device of the character described of the following instrumentalities, to wit, a wheel supported frame, a crank shaft having two projecting supporting arms, means to adjustably secure said crank shaft, a foot lever extending from said crank shaft, a duplex crank shaft, a connecting rod connecting said two crank shafts, and a seed dropping mechanism carried by said supporting frame and supporting arms, the operating disks of which are adapted to be engaged by said duplex crank shaft.

4. The combination in a device of the character described, of a supporting axle, side bars secured to said axle and united at their forward ends, a caster wheel secured to the forward end of said bars, a tongue secured to said caster wheel, a transverse crank shaft secured to said side bars near their rear ends, a trip lever secured to said crank shaft, two supporting arms fixed to said crank shaft, supporting links carried by said arms, a duplex crank shaft secured near the forward ends of said side bars, a rod connecting said two crank shafts, and a seed drill of that type having a furrow opener, two shovel beams and operating wheels, said drill at its forward end being secured to the forward ends of said side bars, said shovel beams being carried by said links, said duplex crank shaft being arranged to be brought into engagement with said operating wheels, all arranged substantially as and for the purpose set forth.

In testimony whereof, I affix my signature, in presence of two witnesses.

JOSEPH F. MAIER.

Witnesses:
ALVIN GATES,
WM. MERZ.